(12) United States Patent
Ueno et al.

(10) Patent No.: US 6,440,514 B1
(45) Date of Patent: Aug. 27, 2002

(54) INSTRUMENT PANEL AND METHOD FOR PRODUCING THE SAME

(75) Inventors: Shigehiro Ueno, Kasugai; Akiyoshi Nagano, Ama-gun; Hikaru Ando, Kasugai; Akio Nakano, Nagoya, all of (JP)

(73) Assignee: Toyoda Gosei Co., LTD, Nishikasugai-gun (JP)

( * ) Notice: Subject to any disclaimer, the term of this patent is extended or adjusted under 35 U.S.C. 154(b) by 0 days.

(21) Appl. No.: 09/346,543

(22) Filed: Jul. 2, 1999

(30) Foreign Application Priority Data

Jul. 3, 1998 (JP) ............................................ 10-189510

(51) Int. Cl.[7] ............................. B32B 3/26; B60R 21/20
(52) U.S. Cl. ......................... 428/43; 428/138; 428/172; 280/728.3; 280/732
(58) Field of Search .......................... 428/43, 138, 172; 280/732, 730.1, 728.1, 752, 728.3

(56) References Cited

U.S. PATENT DOCUMENTS 5,779,262 A * 7/1998 Totani et al. ............ 280/728.3
5,839,752 A 11/1998 Yamasaki et al. ........ 280/728.3

FOREIGN PATENT DOCUMENTS

| DE | 4411283 | 5/1995 |
| EP | 749872 | 12/1996 |

OTHER PUBLICATIONS

Webster's New Universal Unabridged Dictionary, 1996, Barnes & Nobles, New York.*

* cited by examiner

Primary Examiner—Michael Barr
Assistant Examiner—Elena Tsoy
(74) Attorney, Agent, or Firm—Pillsbury Winthrop LLP (57) ABSTRACT

An instrument panel is formed so that a facing layer constituted by three layers consisting of a skin layer, a foam layer and a barrier layer is disposed on the front surface side of a base and a rupture presumptive portion is disposed in a region for covering a folded air bag so that the rupture presumptive portion is opened so as to enable the air bag to protrude when the air bag is unfolded and inflated. The rupture presumptive portion is formed so that cutdown portions are formed so as to extend from the back surface side of the base to the barrier layer along the rupture presumptive portion. A large number of holes are provided at least in the skin layer so as to cover only the rupture presumptive portion and its vicinity.

5 Claims, 11 Drawing Sheets

EXTRUDING STEP

GRAVURE PRINTING STEP

PERFORATING STEP

FIG.13

FOAM LAYER LAMINATING STEP

BARRIER LAYER LAMINATING STEP

FIG.14

EXTRUDING STEP

GRAVURE PRINTING STEP

FIG.15

FOAM LAYER LAMINATING STEP

BARRIER LAYER LAMINATING STEP

INSTRUMENT PANEL AND METHOD FOR PRODUCING THE SAME

BACKGROUND OF THE INVENTION

1. Field of the Invention

The present invention relates to an instrument panel used in a car and a method for producing such an instrument panel, particularly relates to an instrument panel for covering a folded air bag in an air bag apparatus and a method for producing such an instrument panel.

The present application is based on Japanese Patent Application No. Hei. 10-189510, which is incorporated herein by reference.

2. Description of the Related Art

There is a type of an instrument panel disclosed in U.S. Pat. No. 5,839,752 which is disposed so as to cover a folded air bag.

The instrument panel described U.S. Pat. No. 5,839,752 is formed so that a facing layer constituted by three layers consisting of a skin layer, a foam layer and a barrier layer is disposed on the front surface side of a base. Further, a rupture presumptive portion is disposed in a region for covering a folded air bag so that the rupture presumptive portion is opened so as to enable the air bag to protrude when the air bag is unfolded and inflated.

The rupture presumptive portion was formed so that cutdown portions extending from the base to the foam layer are formed intermittently or continuously along the rupture presumptive portion.

Further, pinholes are formed intermittently in the facing layer along the rupture presumptive portion so that the facing layer is ruptured smoothly at the time of the rupture of the rupture presumptive portion.

The above instrument panel is produced as follows. First, a facing layer constituted by three layers consisting of a skin layer, a foam layer and a barrier layer is vacuum-molded to have a predetermined shape. Next, pins are inserted through the facing layer so that pinholes are intermittently formed along a rupture presumptive portion. Next, the facing layer is set, as an insert, in a mold for molding a base and the mold is clamped. A molding material is injected into the cavity of the mold so that the base provided with the facing layer is insert-molded.

Then, the aforementioned cutdown portions extending from the back surface side of the base to the foam layer are provided to form the rupture presumptive portion by use of an ultrasonic welder, or the like. Thus, the instrument panel could be produced.

In the above instrument panel, however, the pinholes provided in the facing layer are formed after the vacuum-molding of the facing layer.

That is, a perforating step is carried out after the facing layer is molded into a predetermined shape. Accordingly, it is difficult to carry out the perforating step, because the facing layer is hardly bent. Accordingly, the production of the instrument panel takes much labor.

SUMMARY OF THE INVENTION

The present invention is designed to solve the aforementioned problem and it is an object of the present invention to provide an instrument panel which can be produced easily and a method for producing such an instrument panel.

In order to achieve the above object, according to an aspect of the present invention, there is provided an instrument panel comprising: a base; a facing layer disposed on a front surface side of the base and including a skin layer, a foam layer and a barrier layer; a rupture presumptive portion disposed in a region for covering a folded air bag, the rupture presumptive portion including cutdown portions formed so as to extend from a back surface side of the base to the barrier layer; and a large number of holes being formed at least in the skin layer so as to cover only the rupture presumptive portion and its vicinity.

According to another aspect of the present invention, there is provided a method for producing an instrument panel comprising the steps of: preparing a pre-facing layer including a skin layer, a foam layer and a barrier layer; forming a large number of holes at least in the skin layer So as to correspond to a portion in which a rupture presumptive portion is to be formed and its vicinity; vacuum-molding the pre-facing layer into a predetermined shape thereby obtaining a facing layer after the step of forming a large number of the holes; insert-molding a base with the facing layer as an insert to dispose the facing layer on a front surface side of the base; and forming a cutdown portion at a portion corresponding to a large number of the hole so as to extend from a back surface side of the base to the barrier layer thereby forming the rupture presumptive portion.

The pre-facing layer can be formed by the following steps of: extrusion molding the skin layer; thermally fusion-bonding the foam layer to the skin layer; and thermally fusion-bonding the barrier layer to a back surface side of the foam layer.

It is preferable that the step of forming a large number of the holes in the skin layer is executed by a perforating step after the thermally fusion-bonding of the foam layer to the skin layer but before the thermally fusion-bonding of the barrier layer.

It is preferable that the step of forming a large number of the holes in the skin layer is executed by a perforating step after the extrusion molding of the skin layer but before the thermally fusion-bonding of the foam layer.

It is possible that the step of forming a large number of the holes in the skin layer is executed by a perforating step after the thermally fusion-bonding of the barrier layer but before the vacuum molding step.

In the instrument panel according to the present invention, at least the skin layer is provided with a large number of holes so as to cover only the rupture presumptive portion and its vicinity. It is not necessary to provide the holes strictly only in the rupture presumptive portion, but the holes may be provided in an area to such an extent that the area includes the rupture presumptive portion. Accordingly, strict controlling of positional accuracy is not required in the perforating step, so that the instrument panel can be produced easily.

Particularly, since strict controlling of positional accuracy is not required in the perforating step, even if the perforating step is performed before the facing layer is vacuum-molded to have a predetermined shape as will be described later and even if the perforated region is displaced at the time of the vacuum-molding of the facing layer thereafter, the perforated region can cover the rupture presumptive portion of the instrument panel securely because the perforated region is provided in a wide area so that the rupture presumptive portion can be ruptured exactly when the air bag is unfolded and inflated.

Further, in the method for producing an instrument panel according to the present invention, the large number of holes provided in the skin layer are formed before the facing layer is formed by vacuum molding. Accordingly, the facing layer at the time of perforation has a shape like a flat sheet before the facing layer is molded into a predetermined shape. The facing layer is therefore easy to handle, so that the facing layer can be perforated easily. Furthermore, because the facing layer is vacuum-molded after the facing layer is perforated, the respective inner circumferential sides of the holes in the skin layer are softened and swollen by heat generated at the time of vacuum molding to thereby block the openings of the holes. Accordingly, the openings of the holes can be made inconspicuous, so that the look of the produced instrument panel can be made nice.

Further, in the case where, the foam layer is thermally fusion-bonded to the skin layer after the skin layer is formed by extrusion molding, and the barrier layer is further fusion-bonded to the back surface side of the foam layer to thereby form the facing layer, the large number of holes to be provided in the facing layer may be formed in a perforating step after the thermal fusion-bonding of the foam layer to the skin layer but before the thermal fusion-bonding of the barrier layer. If so, the circumferential edges of the holes are heated twice at the time of the thermal fusion-bonding of the barrier layer and at the time of vacuum-molding. Accordingly, the openings of the holes can be made more inconspicuous, so that the look of the produced instrument panel can be made nicer.

Further, in the case where, the foam layer is thermally fusion-bonded to the skin layer after the skin layer is formed by extrusion molding, and the barrier layer is further thermally fusion-bonded to the back surface side of the foam layer, the large number of holes to be provided in the facing layer may be formed in a perforating step after the extrusion molding of the skin layer but before the thermal fusion-bonding of the foam layer. If so, the circumferential edges of the holes are heated three times at the time of the thermal fusion-bonding of the foam layer, at the time of the thermal fusion-bonding of the barrier layer and at the time of vacuum molding. Accordingly, the openings of the holes can be made further more inconspicuous, so that the look of the produced instrument panel can be made further nicer.

Features and advantages of the invention will be evident from the following detailed description of the preferred embodiments described in conjunction with attached drawings.

DETAILED DESCRIPTION OF THE PREFERRED EMBODIMENTS

An embodiment of the present invention will be described below with reference to the drawings.

Figure 1:
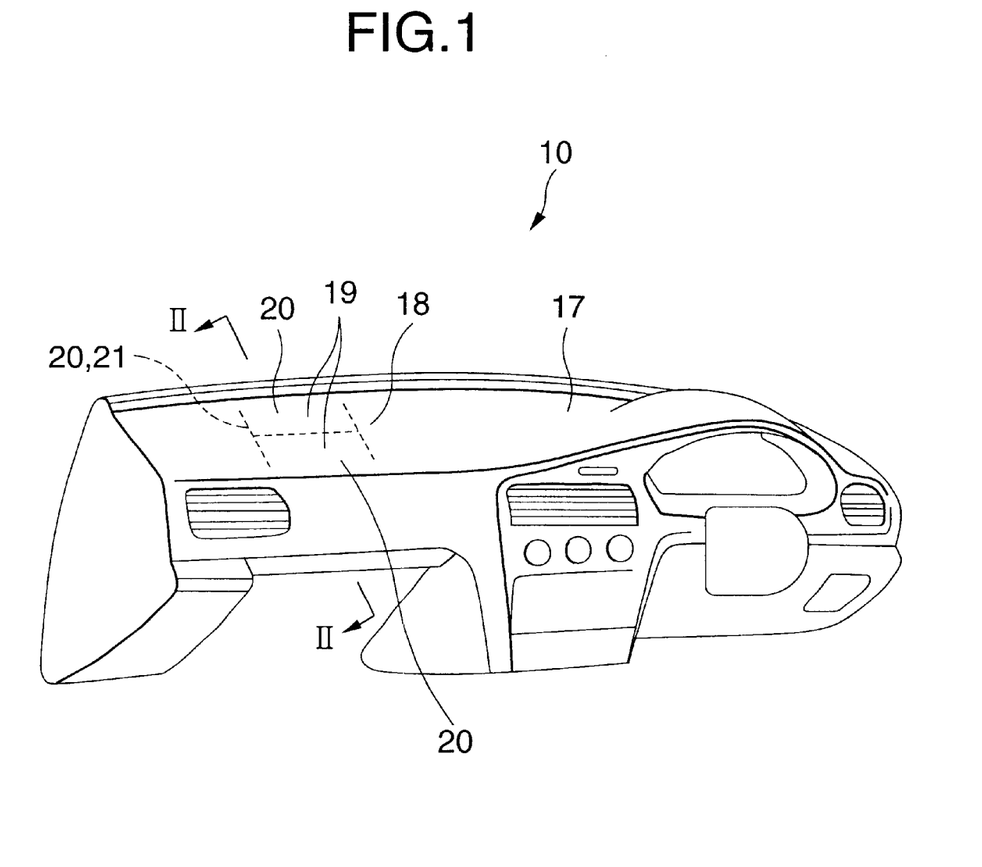
FIG. 1 is a perspective view showing an instrument panel in an embodiment of the present invention.
Figure 2:
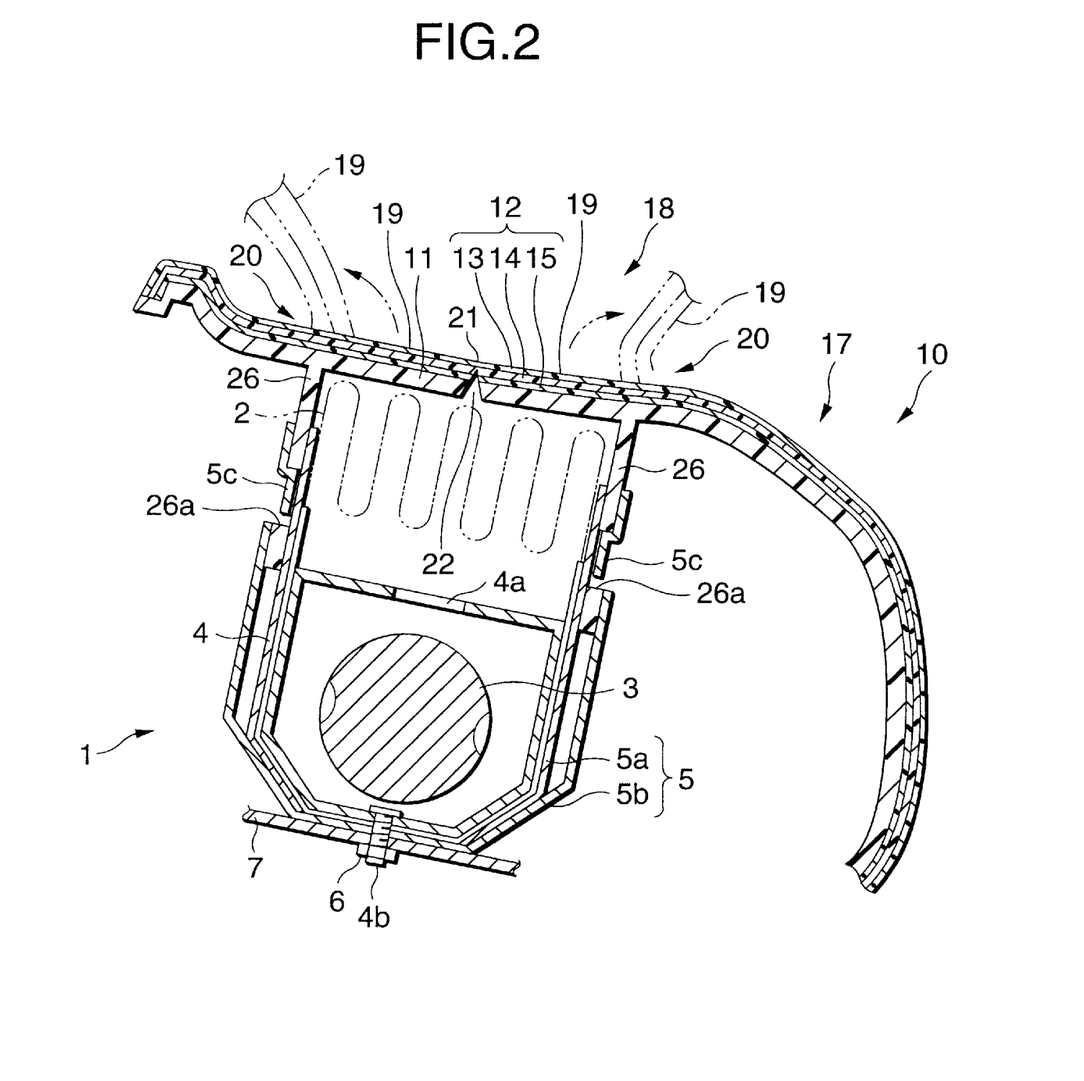
FIG. 2 is a sectional view showing a state of use of the instrument panel in the embodiment and showing the II—II region in FIG. 1.
Figure 3:
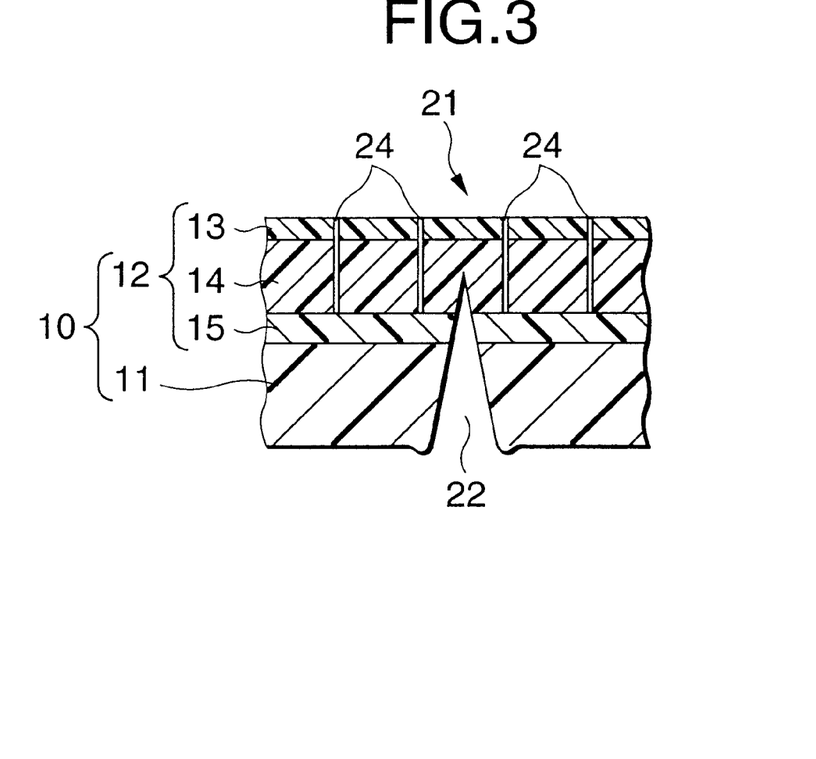
FIG. 3 is an enlarged sectional view of the vicinity of a rupture presumptive portion of the instrument panel in the embodiment.

As shown in FIGS. 1 to 3, an instrument panel 10 in this embodiment is formed into a two-layer structure in which a facing layer 12 is disposed on the front surface of a base 11. Further, the instrument panel 10 has an airbag cover portion 18 for covering a folded air bag 2 in an air bag apparatus 1, and a general portion 17 other than the air bag cover portion 18.

The air bag apparatus 1 will be described below. The air bag apparatus 1 is provided with an air bag 2 which is received in a folded state, a cylinder type inflator 3 for supplying an unfolding and inflating gas into the air bag 2, a tube-like diffuser 4 for diffusing the gas from the inflator 3 to pour it into the air bag 2, and a box-like casing 5 for covering the surroundings of the air bag 2, the inflator 3 and the diffuser 4.

Further, the reference numeral 4a designates a gas flow hole of the diffuser 4; and 4b, a plurality of bolts provided to protrude from the diffuser 4. These bolts 4b are engaged with nuts 6 respectively, so that the casing 5, the air bag 2 and the diffuser 4 are integrated with one another and the air bag apparatus 1 is attached and fixed to a bracket 7 which is provided to protrude from a frame of a vehicle.

Further, the casing 5 has a side wall region which is formed into a double structure of an inner panel 5a and an outer panel 5b. The outer panel 5b is provided with a predetermined number of claws 5c which are cut and raised toward the inner panel 5a side. These claws 5c are locked on the circumferential edges of mount holes 26a of a side wall portion 26 which will be described later.

Further, the air bag cover portion 18 of the instrument panel 10 has a substantially quadrangular tube-like side wall portion 26 extending downward from the back surface of the base 11, and two door portions 19 surrounded by a rupture presumptive portion 21 as a tear line in a region surrounded by the side wall portion 26. A plurality of mount holes 26a are formed in the side wall portion 26 so that the claws 5c provided in the outer panel 5b are inserted so as to be locked in the mount holes 26a.

The rupture presumptive portion 21 is H-shaped in a plan view of the instrument panel 10 so that the two door portions 19, 19 are disposed in the front and rear portions. In the door portions 19, 19, the places in which the rupture presumptive portion 21 is not provided and which are located on the front and rear sides of the vehicle, form hinge portions 20 of the door portions 19 respectively. This rupture presumptive portion 21 is constituted by cutdown portions or grooves 22 formed intermittently or continuously along the rupture presumptive portion 21 so as to extend from the base 11 to the later-described foam layer 14 of the facing layer 12. In this embodiment, the cutdown portions 22 are formed intermittently so as to form intermittent grooves.

Further, a large number of holes 24 are formed in the region of the rupture presumptive portion 21 and its vicinity so as to pierce the later-described skin layer 12 of the facing layer 12. Incidentally, in this embodiment, these holes 24 are formed to pierce the foam layer 14 of the facing layer 12.

The base 11 may be formed of a hard synthetic resin such as filler-containing polypropylene, or the like. In this embodiment, the base 11 is formed of filler-containing polypropylene.

The facing layer 12 is formed into a three-layer laminate structure of the skin layer 13, the foam layer 14 and the barrier layer 15. The skin layer 13 is disposed on the front surface side with an embossed pattern, or the like. The barrier layer 15 is disposed for protecting both the skin layer 13 and the foam layer 14 when the base 11 is molded. The foam layer 14 is disposed to obtain a good touch feeling.

Further, the skin layer 13 is formed of a soft thermoplastic resin such as soft vinyl chloride, olefin thermoplastic elastomer, or the like. The barrier layer 15 is formed of a compatible material, such as olefin thermoplastic elastomer or polypropylene, so that the barrier layer 15 is easily fusion-bonded to the base 11 when the base 11 is molded. Further, the foam layer 14 is formed from a foam synthetic resin such as foam polypropylene, foam polyethylene, or the like.

Incidentally, the skin layer 13, the foam layer 14 and the barrier layer 15 are preferably formed of materials having compatibility so that they are thermally fusion-bonded to one another without using any adhesive agent. In this embodiment, because the barrier layer 15 is formed from olefin thermoplastic elastomer in consideration of the compatibility with the base 11, the foam layer 14 is formed from foam polypropylene and the skin layer 13 is formed from olefin thermoplastic elastomer.

Further, in this embodiment, the thicknesses of the respective layers are selected as follows: the skin layer 13 is 0.7 mm thick; the foam layer 14 is 3.0 mm thick; and the barrier layer 15 is 1.0 mm thick.

The production of the instrument panel 10 according to the embodiment will be described below. First, the facing layer 12 is formed.

Figure 5:
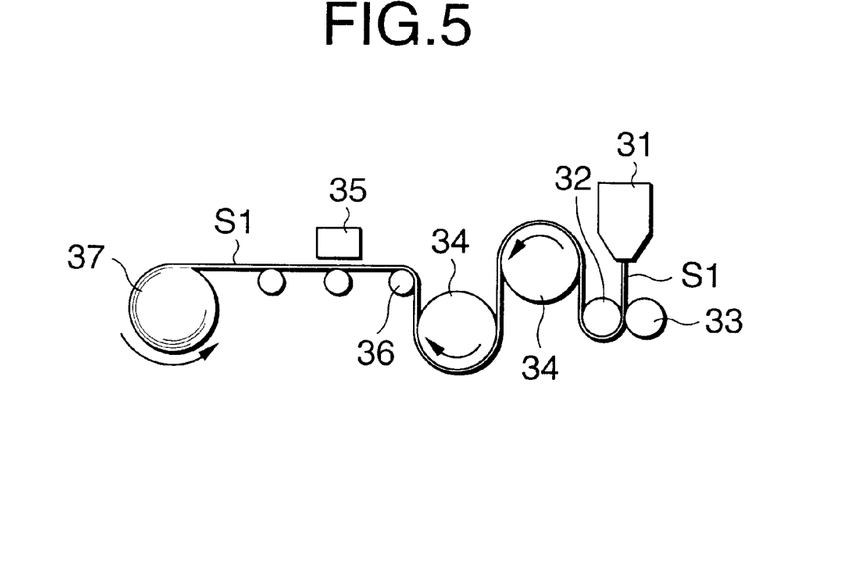
FIG. 5 is a view for explaining extruding step for producing a facing layer in the embodiment.

With respect to the facing layer 12, in an extruding step A shown in FIG. 5, first, a skin layer material S1 is extruded from an extruding die 31 into the space between a drive roll 32 and a pressure roll 33. The skin layer material S1 passes through annealing rolls 34, 34 so as to remove internal stress of the material S1. The skin layer material S1 is subjected to corona discharge by means of a corona discharger 35, and wound up on a wind-up roll 37. Incidentally, the reference numeral 36 designates guide rolls which are freely rotatable.

Figure 6:
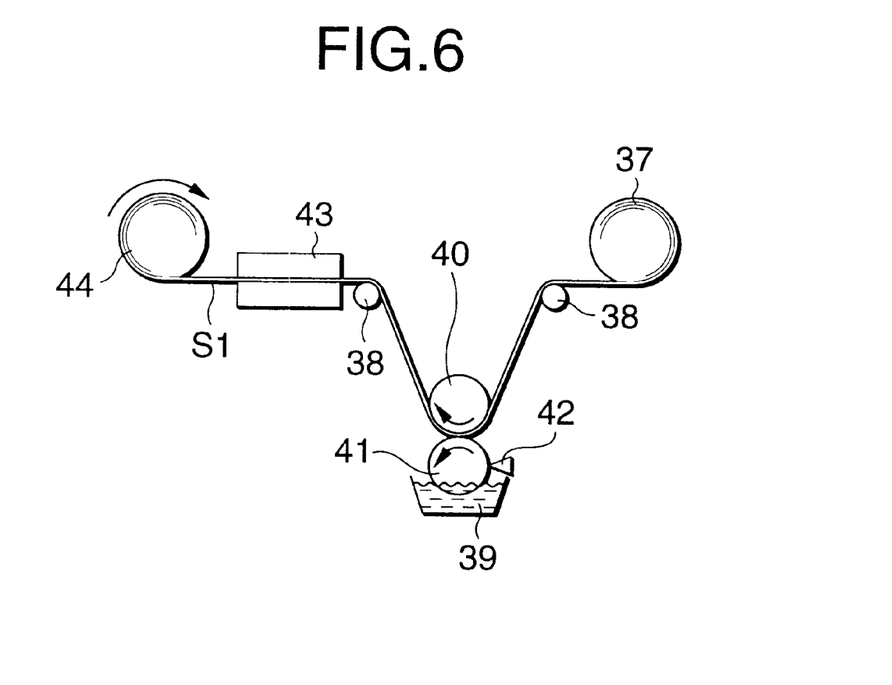
FIG. 6 is a view for explaining gravure printing step for producing the facing layer.

Then, in a gravure printing step shown in FIG. 6, the corona-discharged skin layer material S1 wound up on the wind-up roll 37 is fed out. Paint 39 for imitating leather is applied to the front surface of the skin layer material S1 by means of a mesh roll 41, and then dried in a drying furnace 43. Finally, the skin layer material S1 is wound up on a wind-up roll 44. Incidentally, the reference numeral 38 designates guide rolls; 40, a pressure roll; and 42, a doctor blade.

Figure 7:
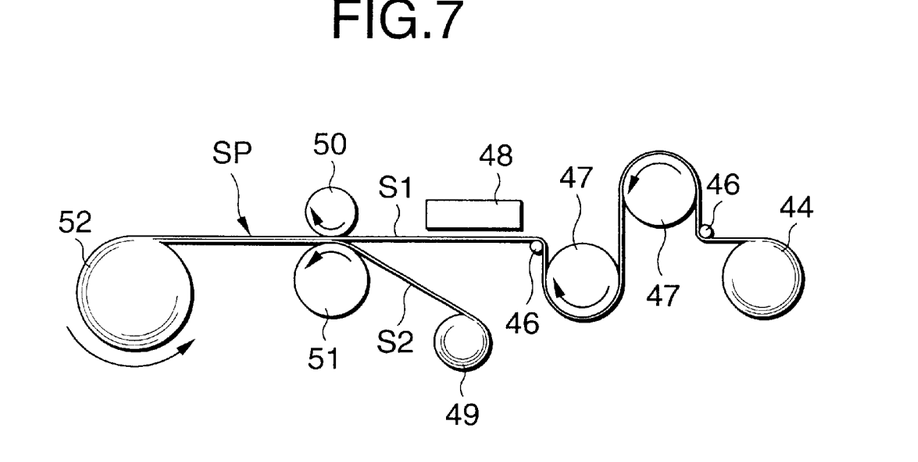
FIG. 7 is a view for explaining foam layer laminating step.

Then, in a foam layer laminating step shown in FIG. 7, the skin layer material S1 fed out from the wind-up roll 44 is preheated through guide rolls 46 and preheat rolls 47, 47 and further heated to a temperature in a range of from about 180° C. to about 200° C. by means of a heater 48. The skin layer material S1 heated thus and a foam layer material S2 fed out from a feed roll 49 are made to pass through the nib between an emboss roll 50 and a rubber roll 51, so that the foam layer material S2 is thermally fusion-bonded to the back surface of the skin layer material S1 to thereby form a pre-facing layer material SP. The pre-facing layer material SP is wound up on a wind-up roll 52. Incidentally, an embossed pattern is applied onto the front surface of the skin layer material S1 by means of the emboss roll 50.

Figure 8:
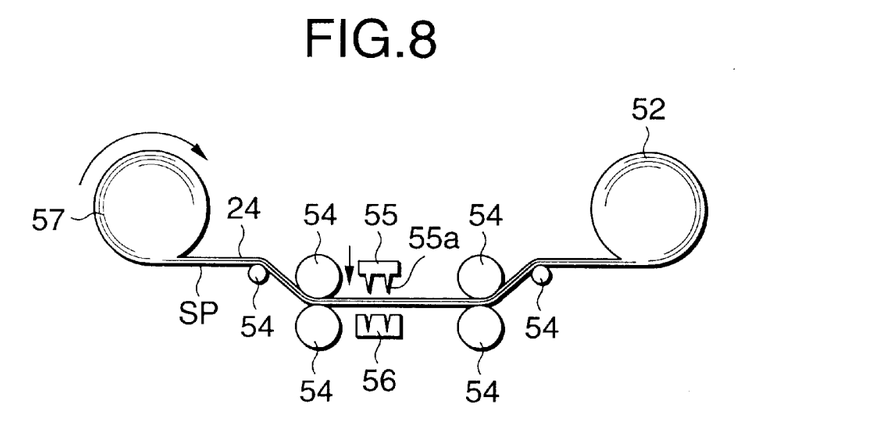
FIG. 8 is a view for explaining perforating step.

Then, in a perforating step shown in FIG. 8, the prefacing layer material SP fed out from the wind-up roll 52 is disposed so as to extend through a plurality of guide rolls 54, to the region of a needle plate 55 having a large number of protruding pins 55a. The needle plate 55 is made to descend to the backing plate 56 side suitably so that a large number of holes 24 are formed in the pre-facing layer material SP. Further, the perforated pre-facing layer material SP is made to pass through a plurality of guide rolls 54 and wound up on a wind-up roll 57. With respect to the size of each pin 55a, in this embodiment, the diameter of the largest outer diameter region of the pin 55a inserted through the pre-facing layer material SP is selected to be 1 mm.

Incidentally, when the holes 24 are formed, cutting positions for cutting the pre-facing layer material SP into a predetermined shape in a barrier layer laminating step which will be described later are marked in advance with circular holes, or the like.

Further, the region in which the holes 24 are to be provided is set in advance to cover the rupture presumptive portion 21 and its vicinity even if the pre-facing layer material SP is cut in the barrier layer laminating step and vacuum-molded to form the rupture presumptive portion 21 which will be described later. Further, in this embodiment, the holes 24 are disposed in an area having a width W in a range of from 60 to 100 mm as shown in FIG. 11C. The concept of the boundary of the width W is as follows. If the width W is smaller than 60 mm, there is a fear that the area of the holes 24 may be out of the region of the rupture presumptive portion 21 which will be formed later, at the time of shaping such as vacuum molding as pre-molding, or the like. If the width W is larger than 100 mm, there are another fear that more labor is required for the perforating step because the area of the holes 24 is widened and a further fear that the external appearance design of the instrument panel 10 may be spoiled because some holes 24 are disposed in a region which will become a convex region at the time of vacuum molding so that the openings of the holes 24 are spread largely in the convex region. Incidentally, the shape of the provision of the holes 24 is as follows. Although the holes 24 in this embodiment are formed along the rupture presumptive portion 21, the holes 24 may be disposed in a rectangular area which is similar to but larger by about 50% than the shape of the door portions 19 if there is no fear that the holes 24 may be disposed in the region which will become a convex region at the time of vacuum molding.

Further, preferably, the holes 24 are provided at intervals in a range of a pitch of from 1 to 4 mm. If the pitch is smaller than 1 mm, it is impossible to form the holes 24. If the pitch is larger than 4 mm, the expansion of the skin layer at the time of rupture becomes so large that the rupture load on the skin layer 13 increases undesirably. Incidentally, in this embodiment, the pitch is selected to be 2 mm.

Further, preferably, the inner diameter of each of the holes 24 just after the perforating step is set to be in a range of from 0.5 to 1.0 mm (0.75 mm in this embodiment). If the inner diameter of each of the holes 24 is smaller than 0.5 mm, the rupture load on the skin layer 13 becomes too large undesirably regardless of the opening of the hole as to whether it is blocked or not. If the inner diameter of each of the holes 24 is larger than 1.0 mm, it is undesirably difficult to block the opening of the hole 24 even in the case where the hole 24 is heated.

Figure 9:
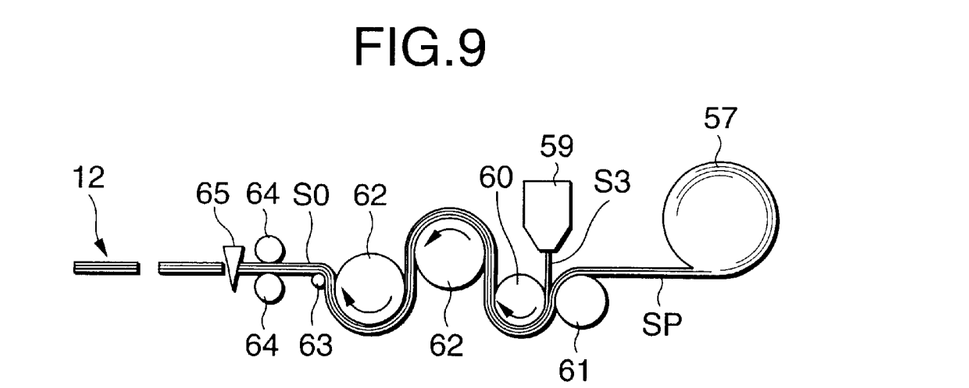
FIG. 9 is a view for explaining barrier layer laminating step.

Further, after the perforating step, in a barrier layer laminating step shown in FIG. 9, the perforated pre-facing layer material SP is fed out from the wind-up roll 57 into the space between a drive roll 60 and a pressure roll 61 and, at the same time, a barrier layer material S3 melted at about 220° C. is extruded from an extruding die 59 into the space between the drive roll 60 and the pressure roll 61, so that the barrier layer material S3 is fusion-bonded to the pre-facing layer material SP to thereby form a facing layer material S0. The facing layer material S0 passes through annealing rolls 62, 62 so as to remove its internal stress. The facing layer material SO then passes through a guide roll 63 and feed rolls 64 and is cut into a predetermined length by use of a cutter 65 to thereby produce a facing layer 12.

Figure 10A:
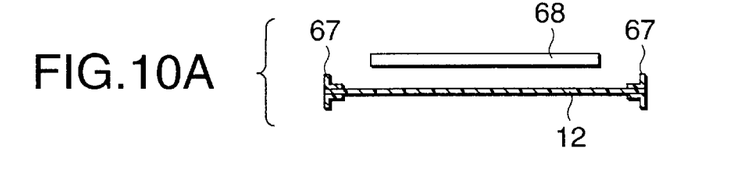
FIGS. 10A to 10E are views for explaining vacuum molding a facing layer in the embodiment.

After that, the facing layer 12 is vacuum-molded in accordance with the instrument panel 10. In this vacuum molding, as shown in FIG. 10A, the circumferential edges of the facing layer 12 are held by clamps 67 and the held facing layer 12 is heated to about 180° C. by means of a heater 68 so as to be softened.

Figure 10B:
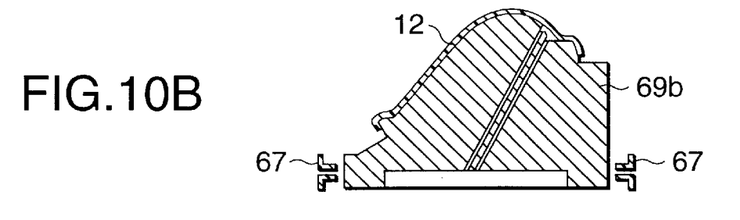
Figure 10C:
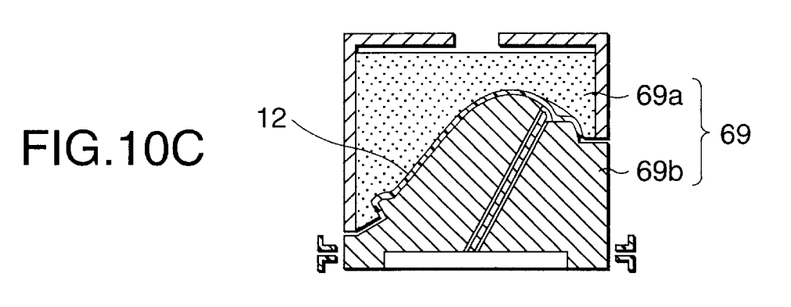
Figure 10D:
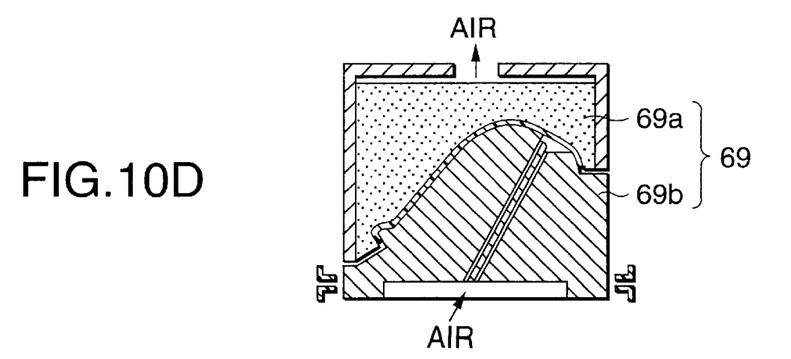

Next, as shown in FIG. 10B, the facing layer 12 is disposed on a lower mold part 69b of a vacuum mold 69. As shown in FIG. 10C, an upper mold part 69a is then moved to clamp the vacuum mold 69. In the upper mold part 69a, air is sucked from the facing layer 12 side. In the lower mold part 69b, air is blown to the facing layer 12 side as shown in FIG. 10D. Accordingly, the facing layer 12 is formed into a predetermined shape.

Figure 10E:
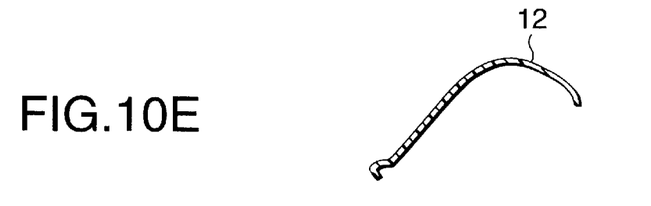

As shown in FIG. 10E, if mold release and trimming are performed after the mold is opened, the facing layer 12 having a predetermined shape can be formed.

Figure 11A:
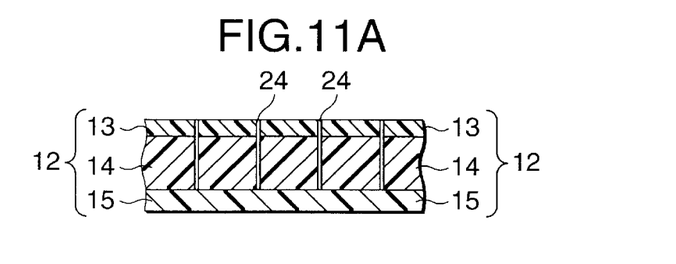
FIGS. 11A to 11C are schematic views for explaining steps of producing the instrument panel in the embodiment.
Figure 11B:
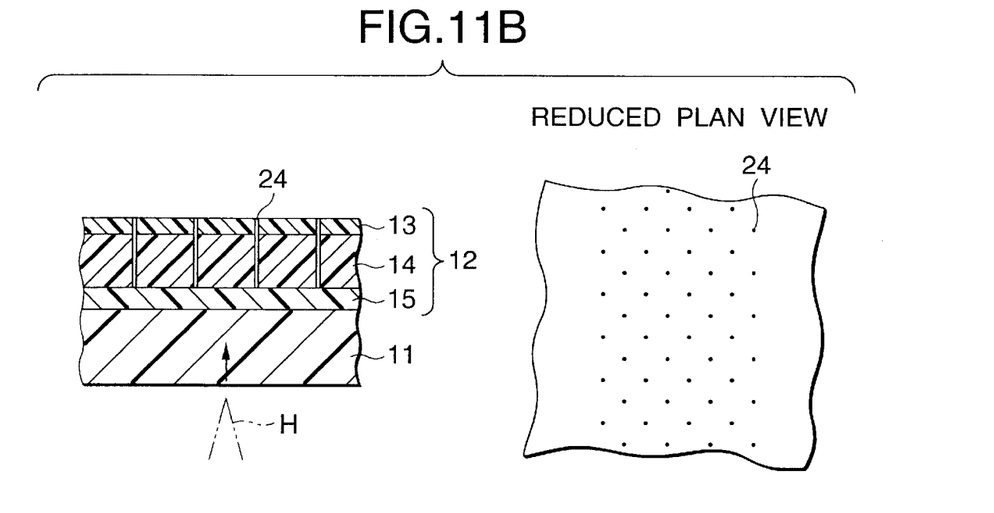
Figure 11C:
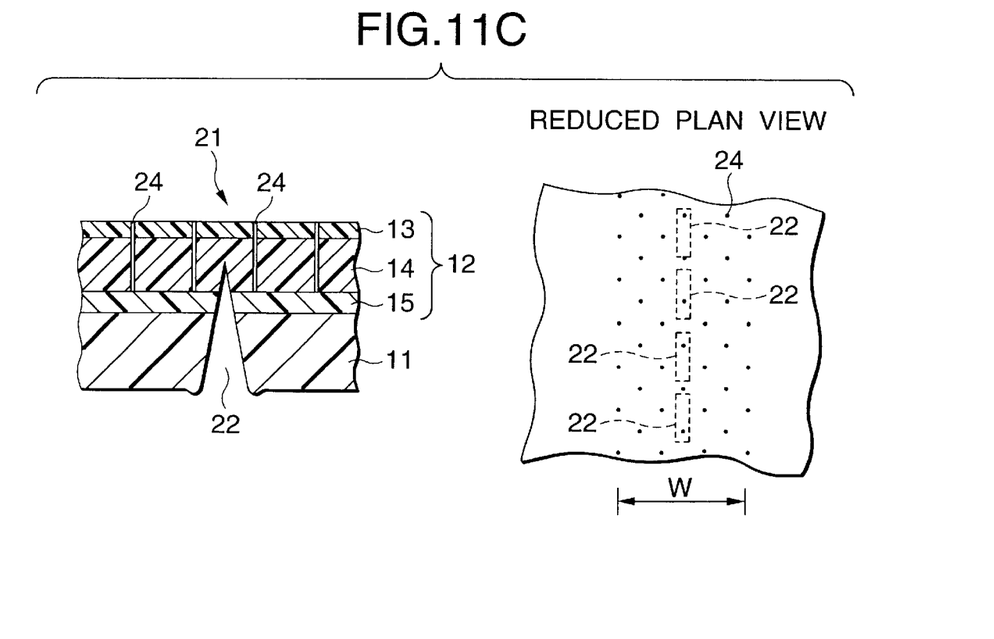

The facing layer 12 formed thus into a predetermined shape in the condition shown in FIG. 11A is set as an insert in a mold for injection-molding the base 11. The mold is clamped. A molding material for the base 11 is injected in a predetermined cavity and solidified. The mold is then released. As shown in FIG. 11B, the base 11 is fusion-bonded to the facing layer 12. The circumferential edge of the base 11 is then trimmed.

As shown in FIGS. 11B and 11C, cutdown portions 22 are then formed intermittently in predetermined positions by means of a processing horn H of an ultrasonic welder to thereby form the rupture presumptive portion 21. In this manner, the instrument panel 10 can be produced. Incidentally, the cutdown portions 22 may be formed by means of such an ultrasonic welder or by means of a heated cutter or a high-frequency cutter.

The instrument panel 10 produced thus is attached to a vehicle. The instrument panel 10 is then connected to the air bag apparatus 1 as follows. The side wall portion 26 is inserted in the space between the inner panel 5a and the outer panel 5b in the casing 5 of the air bag apparatus 1 which is integrated with the bracket 7 by means of the respective bolts 4b. The claws 5c are inserted into the mount holes 26a to be locked therein respectively to thereby connect the instrument panel 10 to the air bag apparatus 1. At the same time, the bracket 7 is fixed to the air bag apparatus 1 by the bolts 4b and nuts 6 and the other end of the bracket 7 is fixed to a frame not shown. Thus, the bracket 7 is connected to the instrument panel 10, so that the air bag apparatus 1 can be attached to the vehicle. Incidentally, predetermined gauges, etc. are disposed when the instrument panel 10 is attached to the vehicle.

Next, in case where a gas is ejected from the inflator 3 at a predetermined time, the gas flows into the air bag 2 via the gas flow hole 4a of the diffuser 4. As a result, not only the rupture presumptive portion 21 is ruptured but also the skin layer 13 of the facing layer 12 is ruptured by means of the holes 24. Accordingly, the door portions 19, 19 are made to open with the hinge portions 20, 20 as pivots respectively, so that the air bag 2 is protruded largely from the instrument panel 10.

In the instrument panel 10 of this embodiment, the large number of holes 24 are provided at least in the skin layer 3 so as to cover only the rupture presumptive portion 21 and its vicinity. It is not necessary to provide the holes 24 strictly only in the rupture presumptive portion 21. That is, a perforating step may be performed so that the holes 24 are provided in an area to such an extent that the area includes the rupture presumptive portion 21. Accordingly, the instrument panel 10 can be produced easily without strictly controlling the positional accuracy in the perforating step.

Particularly, because it is not necessary to control the positional accuracy strictly in the perforating step, the perforating step can be carried out before the vacuum molding for forming the facing layer 12 into a predetermined shape. Even if the perforated region is displaced at the time of vacuum molding after the perforating step, the perforated region can cover the rupture presumptive portion 21 of the instrument panel 10 securely because the perforated region is provided in a wide area. Accordingly, the rupture presumptive portion 21 can be ruptured exactly in case where the air bag 2 is unfolded and inflated.

Further, in the method for producing the instrument panel 10 according to this embodiment, the large number of holes 24 provided in the skin layer 13 are formed before the vacuum molding of the facing layer 12. Accordingly, the facing layer 12 in the perforating step has a shape like a sheet before formation into a predetermined shape. Accordingly, the facing layer 12 is easy to handle, so that the facing layer 12 can be perforated easily.

Figure 4:
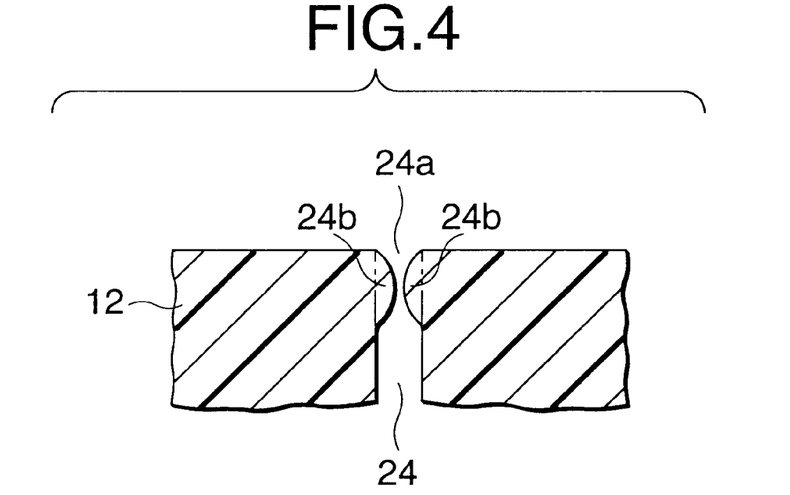
FIG. 4 is an enlarged sectional view of the vicinity of a hole in a skin layer according to the embodiment.

Further, the vacuum molding is performed after the perforating step. As shown in FIG. 4, therefore, the inner circumferential surfaces of the holes 24 in the skin layer 13 are heated at the time of vacuum molding so as to be softened, so that raised portions 24b which are swollen to block the openings 24a of the holes 24 are formed in the inner circumferential surfaces of the holes 24. Accordingly, the openings 24a of the holes 24 can be made inconspicuous, so that the look of the produced instrument panel 10 can be made nice.

Further, in the method for producing the instrument panel 10 according to this embodiment, after the skin layer 13 (skin layer material S1) is formed by extrusion molding, the foam layer 14 (foam layer material S2) is thermally fusion-bonded to the skin layer 13 and the barrier layer 15 (barrier layer material S3) is further thermally fusion-bonded to the back surface side of the foam layer 14 to thereby form the facing layer 12. Further, the large number of holes 24 provided in the facing layer 12 are formed in a perforating step after the thermal fusion-bonding of the foam layer 14 to the skin layer 13 but before the thermal fusion-bonding of the barrier layer 15. In this producing method, the circumferential edges of the holes 24 are heated to about 180° or higher twice at the time of the thermal fusion-bonding of the barrier layer 15 and at the time of vacuum molding. Accordingly, the raised portions 24b are formed securely and the openings 24a of the holes 24 can be made more inconspicuous so that the look of the produced instrument panel 10 can be made nicer.

Figure 12:
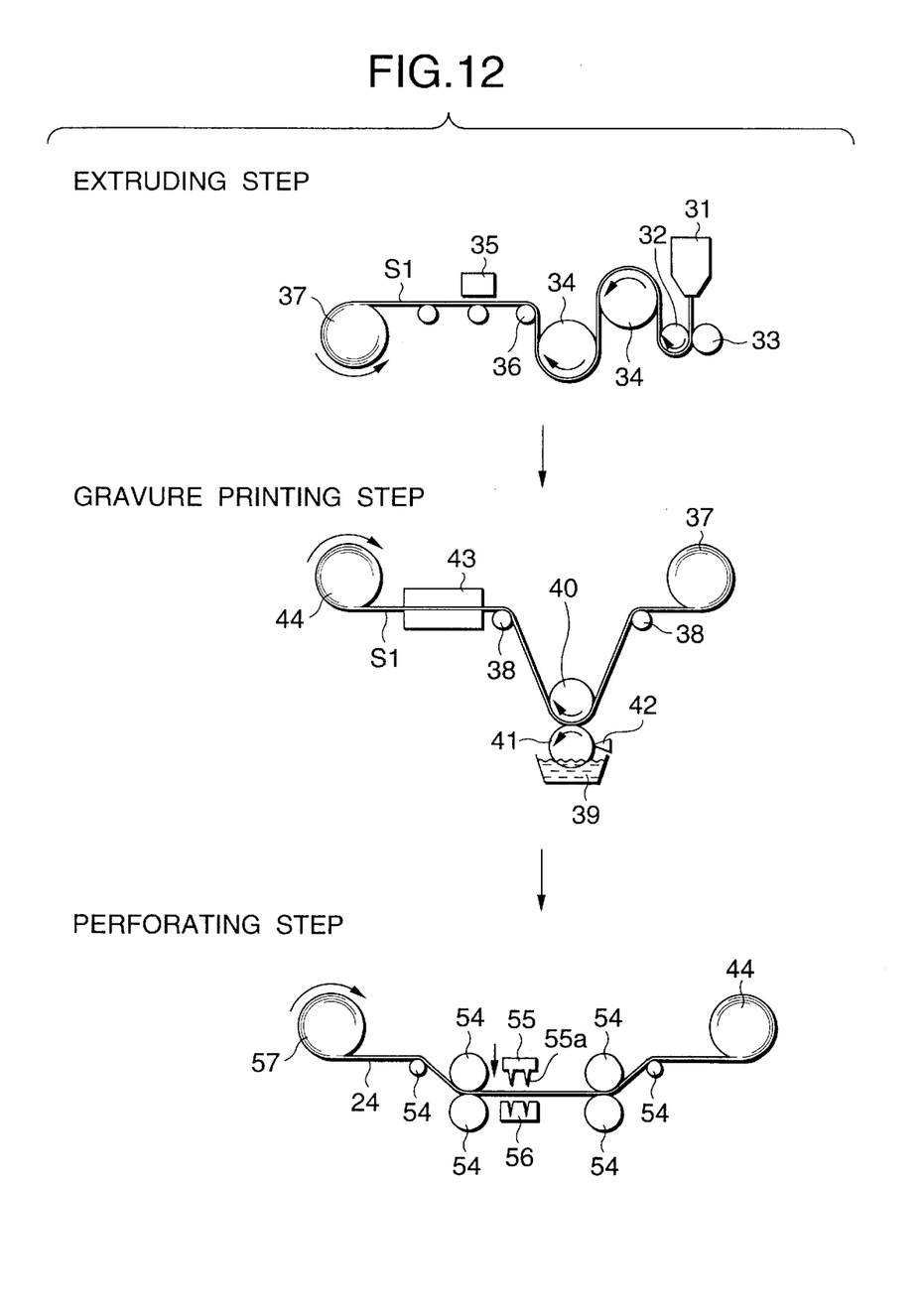
FIG. 12 is a view for explaining the first half of steps for producing a facing layer in another embodiment;.
Figure 13:
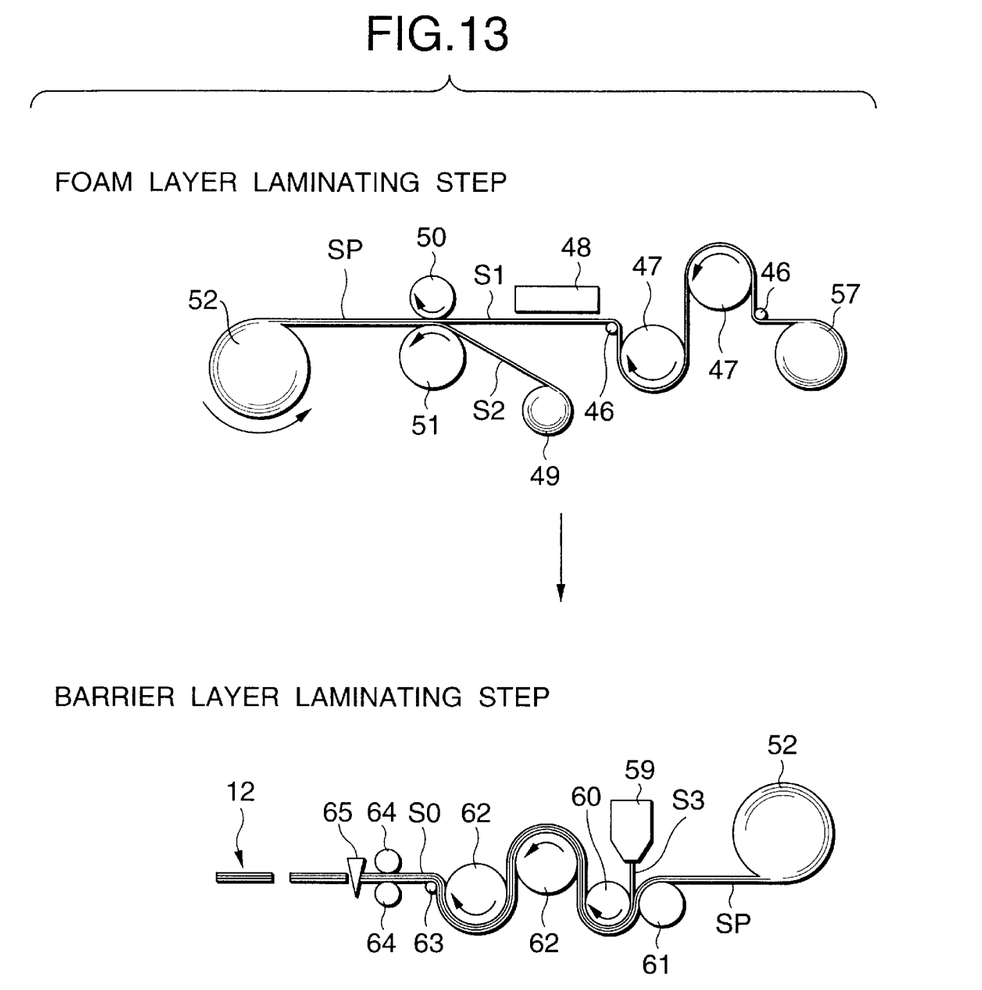
FIG. 13 is a view for explaining the second half of the steps for producing the facing layer in the embodiment.

Although this embodiment has shown the case where the large number of holes 24 are formed in the facing layer 12 in a perforating step after the thermal fusion-bonding of the foam layer 14 to the skin layer 13 but before the thermal fusion-bonding of the barrier layer 15, the present invention may be applied also to the case where the large number of holes 24 are formed in the facing layer 12 in a perforating step by use of a needle plate 55 after the extrusion molding of the skin layer 13 (skin layer material S1) (after both the extruding step and the gravure printing step) but before the thermal fusion-bonding of the foam layer 14 (foam layer material S2) (before the foam layer laminating step), as shown in FIGS. 12 and 13. In this case, the circumferential edges of the holes 24 are heated to about 180° C. or higher three times at the time of the thermal fusion-bonding of the foam layer 14, at the time of the thermal fusion-bonding of the barrier layer 15 and at the time of vacuum molding. Accordingly, the openings 24a of the holes 24 can be made more inconspicuous, so that the look of the produced instrument panel 10 can be made further nicer.

Figure 14:
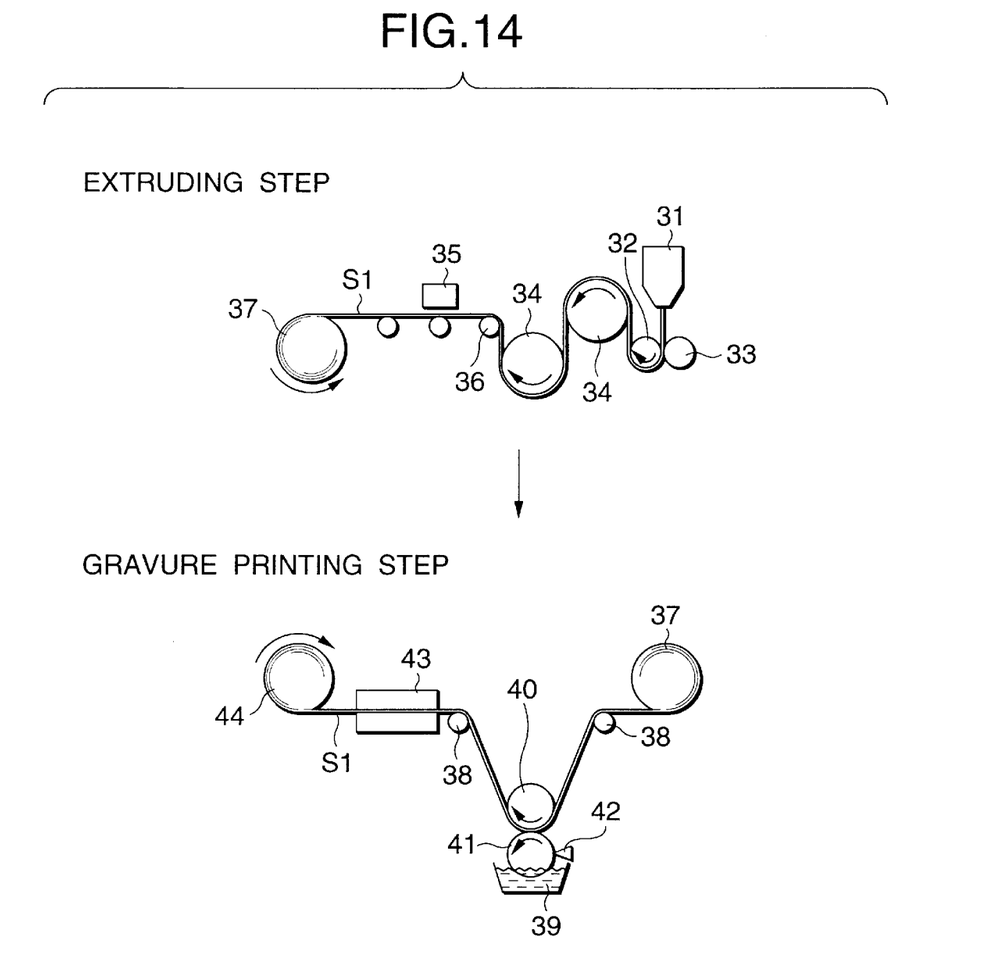
FIG. 14 is a view for explaining the first half of steps for producing a facing layer in a further embodiment.
Figure 15:
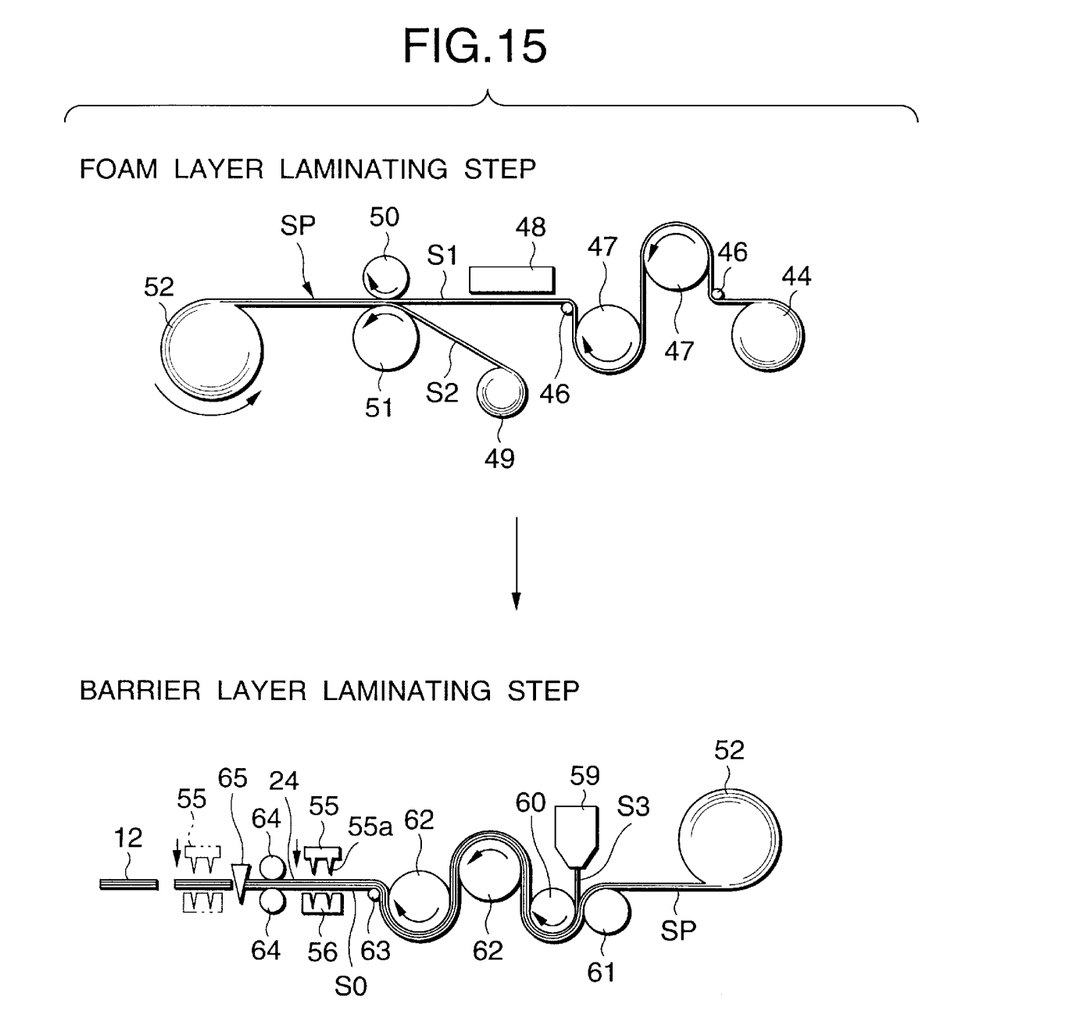
FIG. 15 is a view for explaining the second half of the steps for producing a facing layer in the embodiment.

Of course, if the holes 24 are provided before the vacuum molding of the facing layer 12, the openings 24a of the holes 24 can be made inconspicuous by heat generated at the time of vacuum molding. Accordingly, as shown in FIGS. 14 and 15, the holes 24 may be provided by use of the needle plate 55 before or after the facing layer 12 is cut into a predetermined shape by a cutter 65 in the barrier layer laminating step. In this case, the holes 24 are provided just before vacuum molding. Accordingly, positional accuracy in arrangement of the holes 24 is made good, so that the area for forming the holes 24 can be reduced.

Incidentally, in the case where the holes 24 are provided in the facing layer 12, it is necessary that the holes 24 are provided in such a condition that the holes 24 pierce the skin layer 13 or non-pierced portions are left only slightly in the skin layer 13 so that the skin layer 13 can be ruptured easily when the rupture presumptive portion 21 is ruptured. Because the foam layer 14 is fragile so as to be ruptured easily because of the influence of the cutdown portions 22, it does not matter whether the holes 24 are provided in the form layer 14 or not. Because the cutdown portions 22 are formed as the rupture presumptive portion 21 in the barrier layer 15, it also does not matter whether the holes 24 are provided in the barrier layer 15 or not.

Further, in this embodiment, the cutdown portions 22 are provided up to the foam layer 14. However, because the foam layer 14 is fragile, the performance of the rupture presumptive portion 21 can be secured if the cutdown portions 22 are formed up to the barrier layer 15. Accordingly, the cutdown portions 22 are not required to be formed up to the foam layer 14.

Although this embodiment has shown the case where the facing layer 12 is constituted by the skin layer 13, the foam layer 14 and the barrier layer 15 which are formed from materials capable of being thermally fusion-bonded to one another, it is a matter of course that the facing layer may be formed by lamination of the layers 13, 14 and 15 by use of an adhesive agent. For example, the skin layer 13 may be formed from soft vinyl chloride and the foam layer 14 of foam polypropylene may be bonded to the skin layer 13 by an adhesive agent. Even in such a case, if a perforating step is applied to the skin layer before the vacuum molding of the facing layer, the openings of the holes provided in the skin layer of the facing layer are narrowed by heat generated at the time of vacuum molding after the perforating step. Accordingly, the operation and effect of making the look of the produced instrument panel nice can be obtained.

Further, in the aforementioned embodiment, the facing layer has three layers of the skin layer, the foam layer and the barrier layer. However, it is not necessary to constitute the facing layer by three layers, and the perforating step may be applied to the skin layer before the vacuum molding of the facing layer.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An instrument panel, comprising:

a base;

a facing layer disposed on a front surface side of said base;

a tear line disposed in a region for covering a folded air bag, said tear line including grooves formed so as to extend from a back surface side of said base to said facing layer; and holes in said facing layer nearby said tear line, wherein each hole has a bottom end in said facing layer that is below a top end of each groove;

wherein the facing layer includes a skin layer and a barrier layer disposed on the base, and each of the holes is formed from a front surface side of the skin layer not extending into the barrier layer.

2. An instruments panel according to claim 1, wherein said facing layer includes a skin layer, a foam layer and a barrier layer.

3. An instrument panel according to claim 2, wherein said groove is formed so as to extend from the back surface side of said base to said barrier layer of said facing layer.

4. An instrument panel according to claim 2, wherein said holes are formed at least in said skin layer.

5. An instrument panel, comprising:

a base;

a facing layer disposed on a front surface side of said base;

a tear line disposed in a region for covering a folded air bag, said tear line including grooves formed so as to extend from a back surface side of said base to said facing layer; and holes being formed in said facing layer nearby said tear line, wherein each hole has a bottom end in said facing layer that is below a top end of each groove;

wherein the facing layer includes a skin layer and a barrier layer disposed on the base, and each of the holes is formed from a front surface side of the skin layer not extending into the barrier layer, the instrument panel produced by a method comprising:

preparing a pre-facing layer;

forming said holes in said pre-facing layer so as to correspond to a portion in which the tear line is to be formed and the tear line's vicinity;

pre-molding said pre-facing layer into a predetermined shape thereby obtaining a facing layer after said forming said holes;

thermally fusion-bonding the base with a back surface side of said facing layer; and forming a groove at a portion corresponding to said holes so as to extend from the back surface side of said base to said facing layer thereby forming said tear line.

* * * * *